United States Patent
Benco et al.

(10) Patent No.: US 7,340,258 B2
(45) Date of Patent: *Mar. 4, 2008

(54) MOBILE PHONE COMBINED WITH SATELLITE RADIO CAPABILITY

(75) Inventors: David S Benco, Winfield, IL (US); Kevin J Overend, Elmhurst, IL (US); Baoling S Sheen, Naperville, IL (US); Sandra Lynn True, St. Charles, IL (US); Kenneth J Voight, Sugar Grove, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 132 days.

This patent is subject to a terminal disclaimer.

(21) Appl. No.: 10/899,746

(22) Filed: Jul. 27, 2004

(65) Prior Publication Data

US 2006/0025073 A1 Feb. 2, 2006

(51) Int. Cl.
*H04Q 7/20* (2006.01)
(52) U.S. Cl. .............. 455/452.2; 455/452.1; 455/450; 455/3.02; 455/3.04; 455/2.01; 455/406
(58) Field of Classification Search ...... 455/3.01–3.06, 455/404.1–411, 452.2, 452.1, 450, 422.1, 455/2.01
See application file for complete search history.

(56) References Cited

U.S. PATENT DOCUMENTS

| | | | |
|---|---|---|---|
| 6,519,461 B1* | 2/2003 | Andersson et al. | 455/453 |
| 6,600,918 B1* | 7/2003 | Youngs et al. | 455/414.3 |
| 6,728,531 B1* | 4/2004 | Lee et al. | 455/419 |
| 2005/0136832 A1* | 6/2005 | Spreizer | 455/3.02 |
| 2005/0143086 A1* | 6/2005 | Schwarz | 455/452.2 |
| 2005/0147035 A1* | 7/2005 | Sylvain et al. | 370/230 |
| 2006/0025069 A1* | 2/2006 | Benco et al. | 455/3.02 |
| 2006/0195581 A1* | 8/2006 | Vaman et al. | 709/226 |

* cited by examiner

Primary Examiner—Rafael Perez-Gutierrez
Assistant Examiner—Khai Nguyen
(74) Attorney, Agent, or Firm—Steven R. Santema

(57) ABSTRACT

A wireless telephony network provides satellite radio program information and content, in addition to conventional wireless telephony services, to eligible mobile stations of the wireless telephony network. The wireless telephony network receives satellite radio programming from a satellite radio service network, establishes one or more bearer channels (e.g., conventional voice channels or higher-bandwidth data links) and sends the programming to the one or more mobile stations via the one or more bearer channels. The wireless telephony network monitors and obtains billing information associated with integrated service delivery and coordinates the billing information with a satellite radio service provider. A controlling provider may be selected to control billing for the integrated services such that the customer receives a single statement.

8 Claims, 4 Drawing Sheets

MOBILE PHONE COMBINED WITH SATELLITE RADIO CAPABILITY

CROSS-REFERENCE TO RELATED APPLICATIONS

This application is related to U.S. patent application Ser. No. 10/899,735, titled "Satellite TV Derivative Programming via Mobile Phone," filed concurrently with the present application.

FIELD OF THE INVENTION

This invention relates generally to the field of communication systems and, more particularly, to methods for utilizing and enhancing existing wireless networks to offer satellite radio services.

BACKGROUND OF THE INVENTION

Wireless communications systems are well known in which persons may initiate or receive a call using a wireless communication device (e.g., mobile phone). Most typically, the call is a voice communication, but other forms of wireless service (e.g., paging, short message service, e-mails, data etc.) are also known. The communication device wirelessly communicates, using radio frequency (RF) communication resources, with one or more base stations that are geographically distributed at various sites. The base stations are connected to a call processing control entity, commonly known as Mobile Switching Center (MSC), which coordinates calls and allocates communication resources for different communication devices as they roam from site to site or even to different communication networks. Typically, the MSC further creates billing records associated with wireless calls and forwards the billing records to a separate billing center ("mobile billing center") that produces billing statements for the mobile customers. The billing statements include records of call(s) made from mobile subscribers. Typically, these records include, for each individual call, the calling and called party phone number, the duration of the call in minutes and the time of day the call was made.

Satellite radio is another well-known service that is available today from various service providers. Satellite radio service is commercially available, for example, from Sirius™ and XM™ satellite radio service providers. As presently known, satellite radio service has its own infrastructure that is completely separate from the wireless telephony infrastructure. The satellite radio infrastructure includes, for example and without limitation, antennas, network devices (including content servers, routers and the like) and subscriber database(s). Further, the satellite radio infrastructure has its own independent billing system to maintain billing information and produce billing statements for satellite radio subscribers. Typically, satellite radio subscribers are billed a set price per month depending on the stations or packages of stations to which they subscribe.

Presently, because existing wireless telephony services and satellite radio services are entirely separate entities, customers desiring both services are required to have separate equipment and separate service agreements and are billed separately for the respective services. It would be desirable to integrate the services at least in part, such that wireless telephony subscribers may access satellite radio service via their mobile phone (i.e., without the need for a separate satellite radio receiver). It is contemplated that integrated wireless telephony and satellite radio services would benefit both wireless telephony service providers and satellite radio service providers in terms of increased customer satisfaction and increased revenue. Advantageously, integrated wireless telephony and satellite radio services might be accommodated via a single service agreement and a single billing statement with either the wireless telephony service provider or the satellite radio service provider; or alternatively, the respective service providers may still use separate service agreements and/or send separate billing statements.

SUMMARY OF THE INVENTION

These needs are addressed and a technical advance is achieved in the art by a feature whereby satellite radio service is supported by a wireless telephony network. In such manner, wireless subscribers may access satellite radio service via their mobile phone without requiring a separate satellite radio receiver; and optionally, without requiring a separate service agreement and billing statement.

In one embodiment, there is provided a mobile switching center (MSC) of a wireless telephony network adapted to support integrated wireless telephony and satellite radio services. The MSC includes a satellite service provider gateway, a satellite traffic controller and a base station gateway. The satellite service provider gateway is operable to retrieve satellite programming information from a satellite service provider and send the information to the satellite traffic controller. The base station gateway operably connects the satellite traffic controller to a base station serving at least one mobile station and is operable to communicate satellite programming information from the satellite traffic controller to the at least one mobile station.

In another embodiment, there is provided a method performed by a mobile switching center (MSC) to support integrated wireless telephony and satellite radio services. The MSC receives, from a mobile station, a request for satellite radio program information. Responsive to the request, the MSC retrieves satellite radio program information (e.g., from a satellite radio service provider) and sends at least a portion of the satellite radio program information to the mobile station. Thereafter, the MSC receives, from the mobile station, indicia of one or more selected satellite radio programs defining a program request. In one embodiment, the method further provides for determining eligibility of the mobile station to receive the requested programming. If the mobile station is eligible, the MSC sends the requested programming to the mobile station. Optionally, if the mobile station is not eligible (at least initially), the MSC may offer the user of the mobile station a subscription and, if the user accepts the subscription, the MSC sends the requested programming to the mobile station.

In still another embodiment, there is provided a method for a wireless telephony network to support delivery of satellite radio programming to one or more mobile stations of the wireless telephony network. The wireless telephony network receives satellite radio programming from a satellite radio service network, establishes one or more bearer channels and sends the programming to the one or more mobile stations via the one or more bearer channels. The bearer channels may comprise, without limitation, conventional voice channels and/or data links having greater quality of service than conventional voice channels. Optionally, the wireless telephony network may query respective mobile stations to allow them to choose desired quality of service levels for the satellite radio programming.

In yet another embodiment, there is provided a method to support billing of integrated wireless telephony and satellite radio services. A wireless telecommunication service provider monitors program delivery and obtains billing information associated with integrated services provided to a customer. The wireless telecommunication service provider coordinates the billing information with a satellite radio service provider. A controlling provider (i.e., the wireless telecommunication service provider or the satellite radio service provider) is selected to control billing for the integrated services. The controlling provider bills the customer for the integrated services and reimburses the other provider a negotiated portion of revenues.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
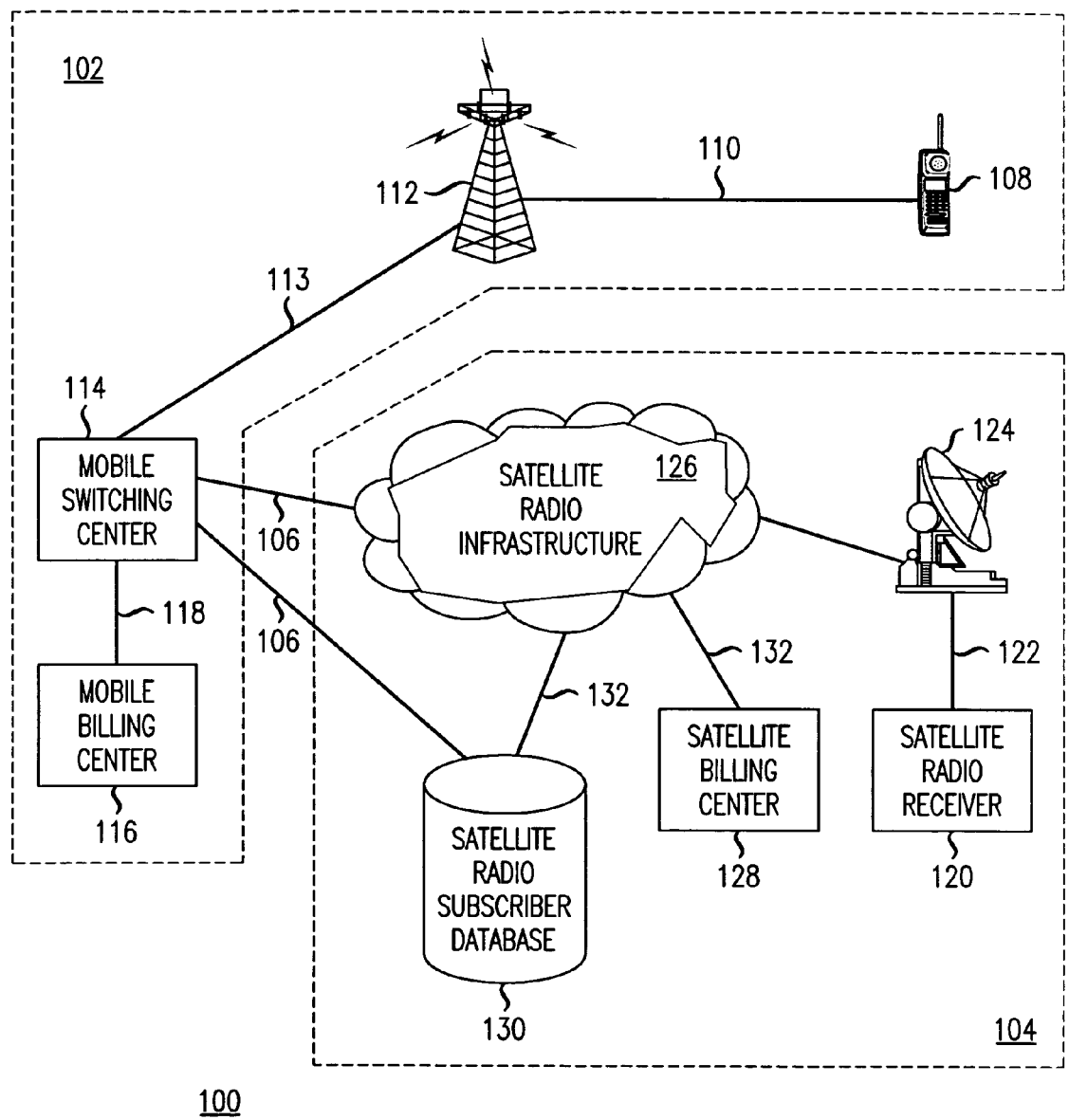
FIG. 1 is a block diagram of a communication system operable to support integrated wireless telephony and satellite radio services according to embodiments of the present invention.

FIG. 1 depicts a communications system 100 supporting integrated wireless telephony and satellite radio services according to embodiments of the present invention. Generally, the communication system 100 comprises a wireless telephony network 102 and a satellite radio service network 104 operably interconnected by links 106. The wireless telephony network 102 and satellite radio service network 104 may comprise public or private systems, or a combination thereof. The links 106 are functional links that may comprise either direct links or one or more links within a separate network (not shown) linking the wireless telephony network 102 and satellite radio service network 104. The linking network may comprise, for example, a data network or the Public Switched Telephone Network (PSTN). The links 106 may be implemented in virtually any physical medium including, without limitation, wireline, wireless or optical links; and may be implemented using virtually any packet- or circuit-based switching, transmission and routing technologies including but not limited to Internet Protocol (IP) and Asynchronous Transfer Mode (ATM) technologies.

The wireless telephony network 102 includes a plurality of wireless communication devices 108 (one shown) that may include, without limitation, mobile phones, laptop computers, personal digital assistants and the like having the ability to receive and decode information, such as voice, video, text or data traffic transmitted over radio frequency (RF) resources 110. For convenience, the wireless communication devices 108 will alternatively be referred to as "mobile units."

The mobile units 108, generally, are adapted to roam between different RF coverage areas, sometimes referred to as "cells" served by base stations 112 (one shown). The wireless telephony network 102 may include multiple base stations 112 serving multiple cells. The RF resources 110 may comprise, without limitation, narrowband frequency modulated channels, wideband modulated signals, broadband modulated signals, time division modulated slots, carrier frequencies, frequency pairs or generally any medium for communicating audio or multimedia content ("bearer traffic") or signaling messages ("control traffic") to and from the mobile units 108. The RF resources may implement air interface technologies including but not limited to, CDMA, TDMA, GSM, UMTS or IEEE 802.11.

Wireless calls to and from the mobile units 108 are controlled by one or more telecommunication switching systems, exchanges or the equivalent, hereinafter termed mobile switching centers (MSC(s)) 114 (one shown). The MSC 114 is connected to the base station 112 by link(s) 113, which may comprise, without limitation, Asynchronous Transfer Mode (ATM) links, ISDN lines, Ethernet LAN, wireless links, and the like. The MSC 114 may comprise, for example, an AUTOPLEX™ switching system, available from Lucent Technologies, Inc. The MSC 114 may be configured for operation with generally any suitable circuit, cell, or packet switching technology. The MSC 114 includes respective memory and processors (not shown), for storing and executing software routines for processing and switching calls, for providing various call features and for providing access to the satellite radio service network 104. The MSC 114 also provides access to the PSTN (not shown). The various interfaces and functional elements of the MSC 114 will be described in greater detail in relation to FIG. 2.

A mobile billing center 116 performs billing services associated with the wireless telephony network 102. The mobile billing center 116 is connected to the MSC 114 by link(s) 118, which may comprise LAN or WAN links or virtually any type of link suitable for transporting data to and from the MSC 114 (and hence to and from the wireless telephony network 102 or satellite radio service network 104.) In one embodiment, the mobile billing center 116 includes a database (not shown) that stores information associated with customers' service plans and billing rates, etc. and usage data associated with the customers' use of the wireless telephony network 102. Generally, based on the applicable rates/plans and usage data of each customer, the billing center computes accumulated charges and periodically sends customers billing statements for accrued services as may be appropriate. In one embodiment, the mobile billing center provides integrated billing for wireless telephony and satellite radio services (i.e., billing for both services in the same statement).

The satellite radio service network 104 serves a plurality of satellite radio receivers 120 ("satellite radios," one shown) having the ability to receive and decode satellite radio content, including voice, music and the like transmitted over RF resources 122 from various satellite radio antennas 124. A satellite radio infrastructure 126 includes content servers and the like (not shown) that provide satellite radio programming to the satellite radios 120 via the satellite radio antennas 124.

Similarly to the mobile units 108 of the wireless telephony network 102, the satellite radios 120 may roam between different coverage areas served by different satellite radio antennas 124 of the satellite radio service network (and indeed, also within coverage areas of the wireless telephony network). Most typically, however, the RF resources and air interface technologies used by the respective networks will differ such that "over-the-air" satellite radio service is not available to mobile units 108 of the wireless telephony network (or at least over-the-air service is not available to mobile units 108 through the satellite radio network). However, embodiments of the present invention provide the ability for mobile units to receive satellite radio content over-the-air via the wireless telephony network: satellite radio content is provided via link(s) 106 from the satellite radio service network to the MSC 114 of the wireless telephony network. The MSC 114 encodes and/or reformats the satellite radio content, as may be necessary, and transmits it via link 116 to the base station 112. The base station 112, in turn, encodes the satellite radio content for transmission using RF resources 110 and air interface technology that may be received and decoded by mobile unit(s) 108.

A satellite billing center 128 performs billing services associated with the satellite radio service network 104; and an associated satellite radio subscriber database 130 stores information associated with satellite customers' service plans and billing rates, etc. The satellite billing center and subscriber database 128, 130 are connected to the satellite radio infrastructure by link(s) 132, which may comprise LAN or WAN links or virtually any type of link suitable for transporting data to and from the satellite radio infrastructure 126. Generally, based on the applicable rates/plans and usage data of each customer, the billing center 128 computes accumulated charges and periodically sends customers billing statements for accrued services as may be appropriate. The billing center 128 may compute charges for conventional satellite radio service customers (i.e., those that receive satellite radio service via a satellite radio receiver 120), for those that receive satellite radio service via the wireless telephony network 102, or some combination or portion thereof. In one embodiment, the satellite billing center 128 coordinates information with the mobile billing center 116 such that customers may receive an integrated billing statement including charges for both services in the same statement.

Figure 2:
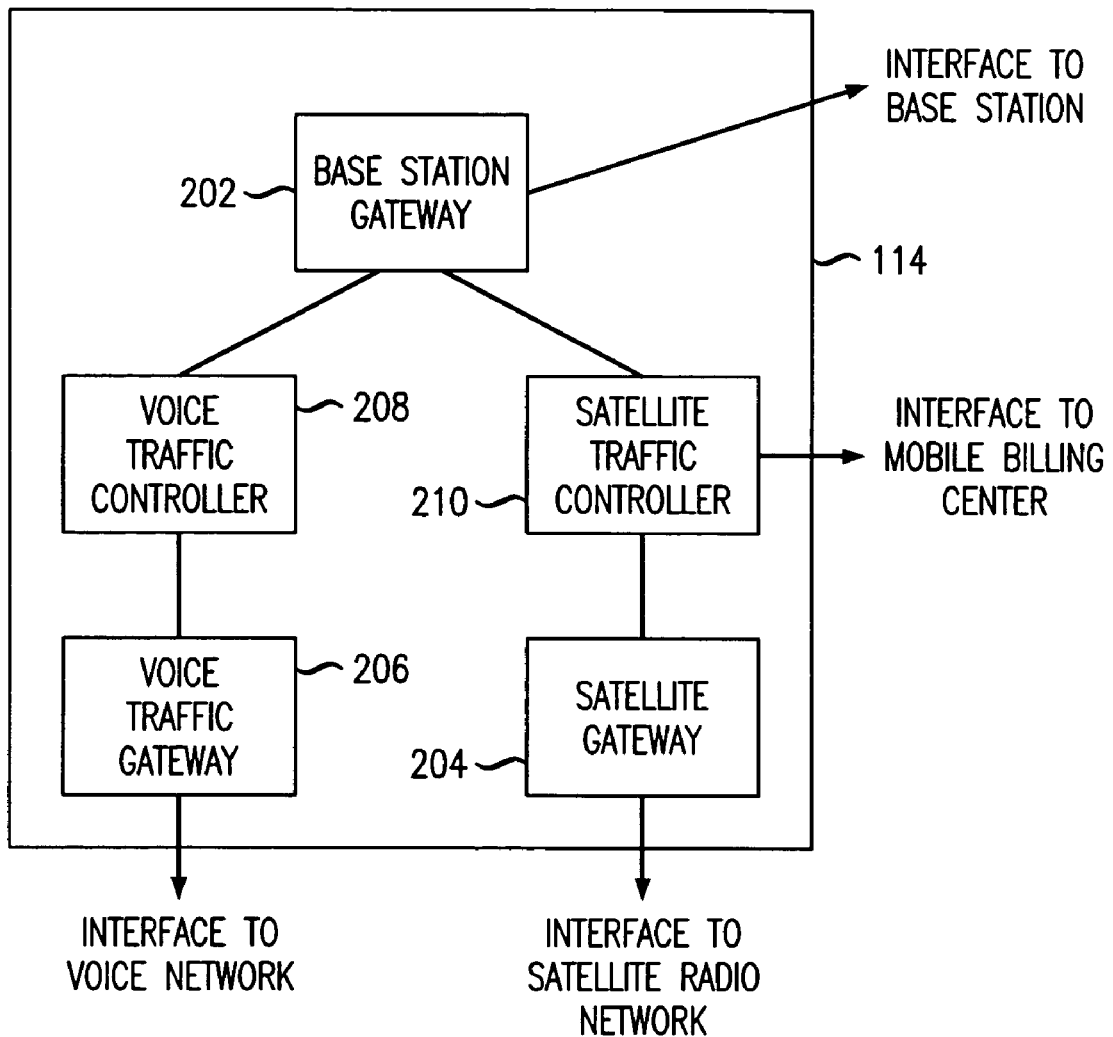
FIG. 2 is a block diagram of a mobile switching center (MSC) for use in a communication system supporting integrated wireless telephony and satellite radio services.

Turning now to FIG. 2, there is shown a block diagram of an MSC 114 adapted for use in a communication system of the type shown in FIG. 1 that supports integrated wireless telephony and satellite radio services. As shown, the MSC 114 includes three functional "gateway" elements: a base station gateway 202 that links the MSC to a base station (e.g., base station 112, FIG. 1), a satellite gateway 204 that links the MSC to a satellite radio service infrastructure (e.g., infrastructure 126, FIG. 1) and a voice traffic gateway 206 that links the MSC to a voice network (e.g., the PSTN) or another MSC. The gateway elements 202, 204, 206 are functional elements that may reside in one or more physical devices.

The base station gateway 202 performs addressing and routing functions, as may be necessary, to divide data received from the base station into two paths—a voice path to the voice traffic gateway 206 via a voice traffic controller 208 and a satellite data path to the satellite gateway 204 via a satellite traffic controller 210. The voice path accommodates bearer and control traffic conventionally associated with wireless telephony; and the satellite data path accommodates bearer and control traffic associated with satellite radio information and content. The base station gateway also operates to send data from the voice path and satellite data path to the base station 112 for delivery to mobile units 108. In one embodiment, the data from the satellite data path comprises a multiplexed traffic stream; and the base station gateway is operable to extract from the multiplexed traffic stream, a plurality of individual traffic streams designated for individual mobile units 108.

The satellite gateway 204 performs protocol conversion and routing functions, as may be necessary, to exchange bearer and control traffic between the satellite radio infrastructure 126 and the MSC 114. The voice traffic gateway 206 performs protocol conversion and routing functions, as may be necessary, to exchange bearer and control traffic between the voice network and the MSC 114. Optionally, the MSC may include a plurality of satellite gateways 204 operable in combination to retrieve bearer and control traffic with a plurality of satellite service providers. In one embodiment, the plurality of satellite gateways 204 receive and buffer traffic from the plurality of service providers, yielding a multiplexed traffic stream, the satellite traffic controller being operable to send the multiplexed traffic stream to the base station gateway 202.

The voice traffic controller 208 and the satellite traffic controller 210 manage service requests associated with conventional wireless calls and satellite radio service requests, respectively. The voice traffic controller 208 and the satellite traffic controller 210 may be embodied in one or more physical devices. The controllers 208, 210 receive call requests or satellite service requests, respectively, and determine an availability of bandwidth to support the request (i.e., to support bearer traffic associated with the request). If bandwidth is available, the controllers 208, 210 reserve bandwidth sufficient to support the request.

Generally, until such time as channel(s) are allocated to support bearer traffic, any communication that occurs between and among the controllers 208, 210 and the mobile unit 108, or between the controllers 208, 210 and the voice network or satellite radio infrastructure, is accommodated by a relatively low-bandwidth control channel; greater-bandwidth channels (or greater numbers of sub-channels occupying the available bandwidth) is usually required for bearer traffic. Typically, the greater the bandwidth (or greater numbers of sub-channels occupying an available bandwidth), the greater is the quality of service. In one embodiment, the voice traffic controller 208 and the satellite traffic controller 210 will support service requests having varying quality of service levels. For example, it is contemplated that greater quality of service will be required for satellite radio bearer traffic than for conventional voice bearer traffic. In one embodiment, the quality of service is selected by the controllers 208, 210 depending on the service request as appropriate. Optionally, the controllers 208, 210 may negotiate quality of service with the mobile unit 108, the wireless telephony network 102 and/or the satellite radio service network 104. In one embodiment, for example, the controller 210 may query the mobile unit 108 to select between multiple service levels available for delivery of satellite radio content.

In one embodiment, the satellite traffic controller 210 performs a filtering function to monitor and control the type or amount of satellite radio content (and optionally, the quality-of-service for such satellite radio content) provided to various customers, which content or quality of service may vary based on the subscription status of the customers or as may be governed or restricted by agreement(s) with the satellite radio service provider. For example, requests for satellite radio content might be quickly accommodated for customers who are existing subscribers to the satellite radio service; whereas such request might be denied (at least initially) for non-subscribers. To that end, the controllers 208, 210 receive identifying information (such as a mobile identification number, or MIN) from the mobile unit 108 during call set-up. Thereafter, the controllers may query the appropriate subscriber database to determine the subscription status of the customer.

In one embodiment, the satellite traffic controller 210 further performs a logging function to record the type, amount of content and/or quality-of-service provided to various customers. The satellite traffic controller periodically provides this information to the mobile billing center to accommodate billing for satellite radio service provided via the wireless telephony network 102.

Figure 3:
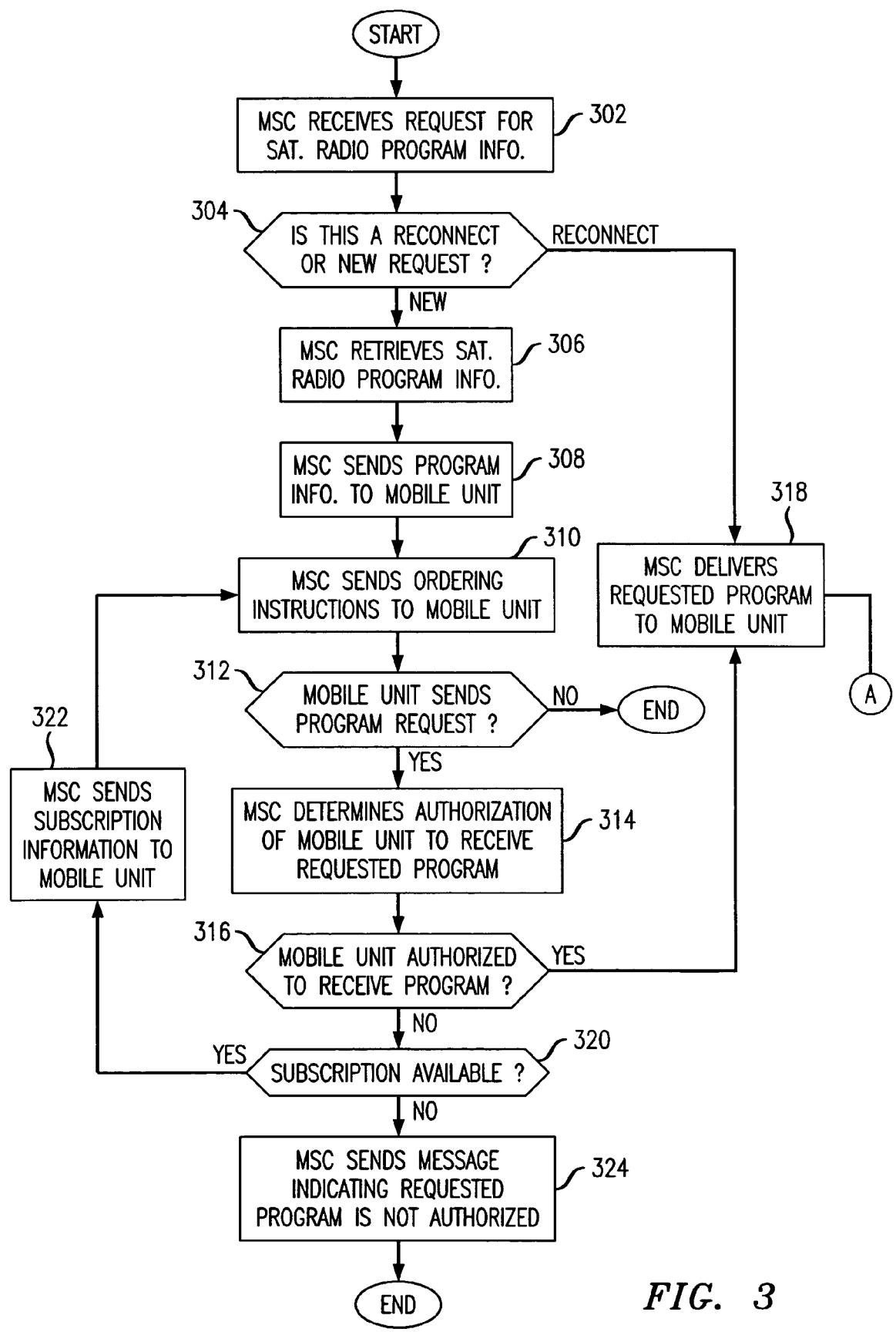
FIG. 3 is a flowchart showing steps performed by an MSC supporting integrated wireless telephony and satellite radio services to process requests for satellite radio programming.

FIG. 3 is a flowchart of a method that may be implemented in a communication system of the type shown in FIG. 1 to offer satellite radio programming to mobile phone users. The steps of FIG. 3 are implemented using stored software routines within the satellite traffic controller 210 of the MSC 114.

The method begins at block 302, when the MSC 114 receives a request for satellite radio program information from a wireless communication device ("mobile unit") 108. In conjunction with the request, the mobile unit 108 sends identifying information, such as a mobile identification number (MIN). The mobile unit may initiate the request by calling a particular number, entering a code, pressing a key or using generally any other appropriate user interface available to the mobile unit. In one embodiment, the request is communicated via control signaling between the mobile unit 108 and the base station 112, then from the base station 112 to the MSC 114. Alternatively, the request may be received in conjunction with an active call. With reference to FIG. 2, the request is received by the base station gateway 202 and passed to the satellite traffic controller 210.

At step 304, the MSC determines whether the request is a new request or a reconnect request. A reconnect request may be received, for example, after the MSC has already established a bearer channel for satellite radio service delivery to the mobile unit and then the mobile unit encountered a service interruption during the delivery. When this occurs, in one embodiment, the MSC will reserve the bearer channel at least temporarily to allow time for the mobile unit to reconnect. Then, if the mobile unit requests reconnect within a designated time-out period, the MSC will resume program delivery to the mobile unit via the previously established bearer channel.

In the case where the request is a new request, the MSC retrieves satellite radio program information at step 306. The information may comprise, for example, a menu of programming options. In one embodiment, the MSC queries the satellite radio infrastructure to receive the program information. Alternatively, the MSC may have the program information already stored in memory resulting from a previous query or from a download initiated by the satellite radio infrastructure. In either case, the MSC reformats the program information, as may be necessary, and sends the program information to the mobile unit at step 308.

At step 310, the MSC sends ordering instructions to the mobile unit. For example, the ordering instructions may specify particular codes, keys or key sequences for the customer to specify a requested program or block of programs. Further, in one embodiment, the ordering instructions allow for the user to select a type of delivery or service level. For example, the user might have the option of selecting a conventional voice channel or a higher-bandwidth data channel (e.g., wireless voice-over-IP).

At step 312, the MSC determines whether it receives a program request from the mobile unit. The MSC receives a request, for example, if it detects the mobile unit 108 has entered a particular code, key or key sequence that identifies a particular program or block of programs consistent with the ordering instructions. In one embodiment, the MSC requires that program requests be sent within a designated time-out period (e.g., 1 minute) after having sent the ordering instructions. The program request may be communicated via control signaling or in conjunction with an active call. If the MSC does not receive a program request within the designated time-out period, the process ends.

If the MSC receives a program request, the process proceeds to step 314 wherein the MSC determines whether the mobile unit is authorized to receive the requested program and/or requested type of delivery. It is contemplated, for example, that satellite radio content via the wireless telephony network may be available only for users having subscribed to a satellite radio service (i.e., having a separate service agreement with a satellite service provider). Alternatively or additionally, satellite radio content could be offered on an hourly fee basis, either for individual programs or packages of programs, to mobile phone users who do not have separate agreements with a satellite service provider. In one embodiment, the MSC accomplishes step 314 by querying the mobile billing center (or alternatively, the satellite billing center or satellite subscriber database) to determine authorization status of the customer.

At step 316, the process takes one of two paths depending on the outcome of step 314. If the customer is authorized to receive the program, the process branches to step 318 wherein the MSC establishes a bearer channel and delivers the requested program to the mobile unit. If the customer is not authorized to receive the program, a determination is made at step 320 whether a subscription is available to be offered to the mobile unit. If so, the MSC sends subscription information to the mobile unit at step 322. If not, the MSC sends a message to the mobile unit at step 324 indicating that the requested program is not authorized.

As will be appreciated, the availability of a subscription and the associated subscription information may be governed or restricted by agreement(s) with the satellite radio service provider. It is possible, for example, that satellite radio content via the wireless telephony network may be made available only for users agreeing to sign a conventional service agreement with a satellite service provider. Alternatively or additionally, satellite radio content could be offered on a "pay-per-listen" subscription basis, either for individual programs or packages of programs, to mobile phone users who do not have separate agreements with a satellite service provider (or to users having separate subscriptions that do not otherwise authorize the requested programming).

After the MSC sends subscription information at step 322, the process returns to steps 310, 312, 314, 316 substantially as has been described. The MSC sends ordering instructions at step 310. As will be appreciated, the ordering instructions may be included within the subscription information sent to the mobile unit at step 310 or may be sent via separate message. At step 312, the MSC determines whether it receives a subscription request from the mobile unit. The MSC may require that subscription requests be sent within a designated time-out period (e.g., 1 minute) after having sent the ordering instructions. In one embodiment, if the MSC receives a subscription request for a particular program or group of programs, the mobile unit is authorized by default to receive those programs; the MSC will determine at steps 314, 316 that the mobile unit is authorized to receive the requested program and the MSC at step 318 will deliver the requested program to the mobile unit.

Figure 4:
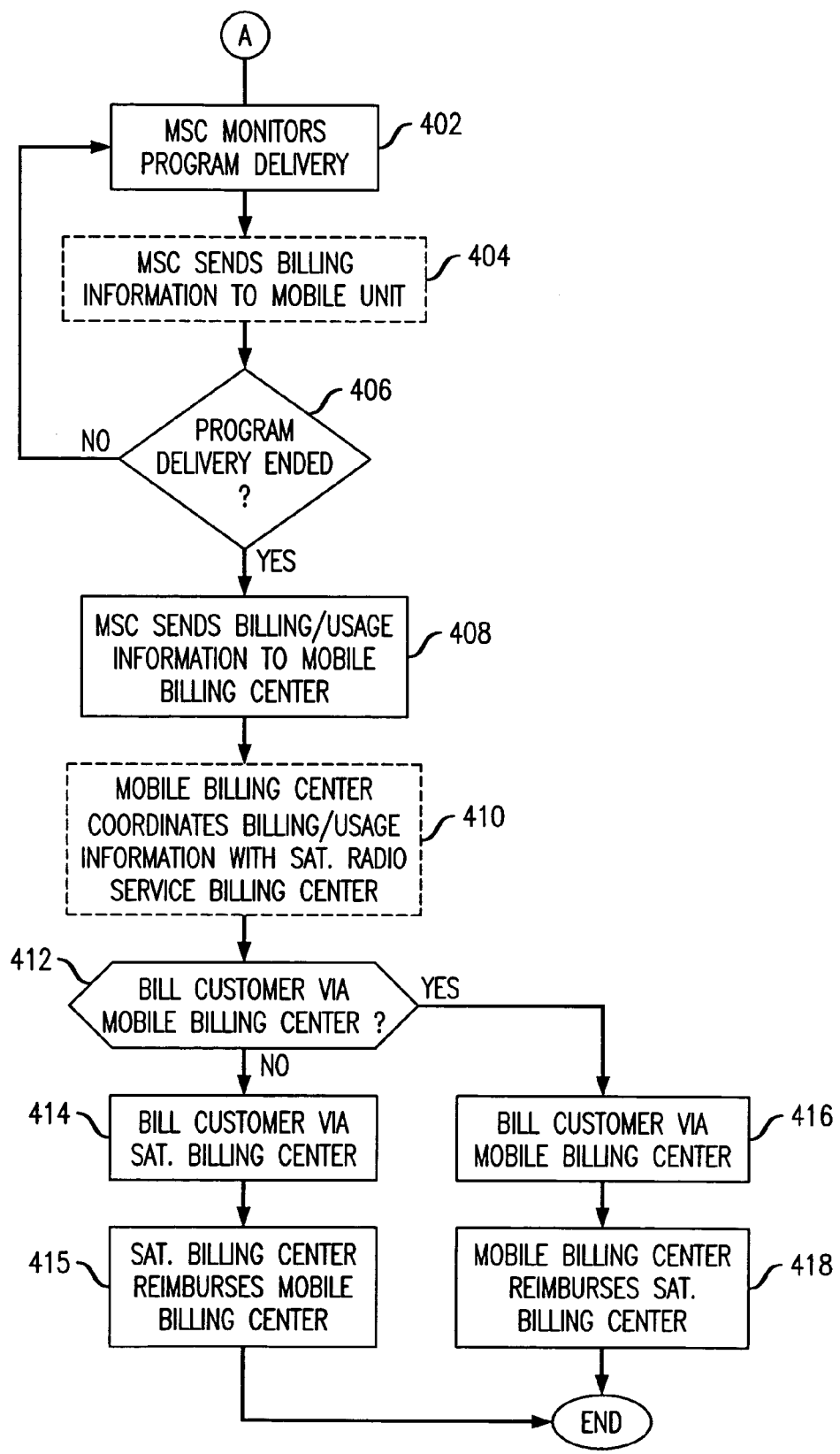
FIG. 4 is a flowchart showing a method for billing integrated wireless telephony and satellite radio services.

FIG. 4 is a flowchart showing a method for billing integrated wireless telephony and satellite radio services according to an embodiment of the present invention. The steps of FIG. 4 are implemented, where applicable, using stored software routines within the satellite traffic controller 210 of the MSC 114 and the mobile billing center 116. The method presumes that satellite radio content is, has been or will be delivered from the MSC to an authorized mobile unit 108 at step 318, FIG. 3.

At step 402, the MSC monitors program delivery and determines a billing amount or optionally, determines usage information such as service type, content type and/or level of content associated with the program delivery (e.g., number or size of messages/packets) from which a billing amount may be derived. Optionally, at step 404, the MSC may send billing/usage information to the mobile unit. This may occur upon completion or partial completion of the service delivery to the end user.

Until such time as program delivery has ended, determined at step 406, the MSC continues to monitor and accumulate billing/usage information. When the program delivery has ended, the MSC at step 408 sends the billing/usage information to the mobile billing center 116. At step 410, the mobile billing center coordinates the billing/usage information with the satellite radio service billing center 128. As will be appreciated, the manner of coordination is an implementation decision that may take several forms; it is contemplated that the particular amount and degree of coordination will be governed by appropriate agreement(s) between the wireless telephony network 102 and satellite radio service network 104 and/or the subscribers. Suffice it to say that the amount of coordination should enable the respective networks to determine which network is controlling billing for the program delivery, if such control has not been predetermined; and to provide or retain sufficient information, as the case may be, to support billing, logging, record-keeping or auditing needs of the respective networks associated with the program delivery.

In one embodiment, billing is controlled either by the mobile billing center or the satellite billing center (i.e., customers will be billed by one or the other). In such manner, the customer receives a single billing statement. Alternatively, billing may be combined with both centers sending separate billing statements. At step 412, it is determined whether the customer will be billed by the mobile billing center. If so, the mobile billing center bills the customer at step 416. As will be appreciated, the step of billing the customer may be accomplished on a periodic basis (e.g., monthly) possibly several days after the service delivery. Then, at step 418, the mobile billing center reimburses the satellite billing center all or part of the billed charges as may be appropriate. For example, suppose the wireless telephony network 102 and satellite radio service network 104 have a billing arrangement whereby the mobile billing center controls billing for integrated service and revenues are divided 90/10 (i.e., 90% to the satellite radio services network and 10% to the wireless telephony network). In such case, the mobile billing center will bill the customer (and hence collect revenue) for the service and then reimburse 90% of the revenues to the satellite radio service network. In practice, this payment may occur several minutes or hours after the transaction (e.g., at close of business) as is customary for banking transactions.

If billing is to be controlled by the satellite billing center, the satellite billing center bills the customer at step 414 and at step 415, the satellite billing center reimburses the mobile billing center all or part of the billed charges as may be appropriate. For example, suppose the wireless telephony network 102 and satellite radio service network 104 have a billing arrangement whereby the satellite radio service network controls billing for integrated service and revenues are divided 90/10 (i.e., 90% to the satellite radio services network and 10% to the wireless telephony network). In such case, the satellite billing center will bill the customer (and hence collect revenue) for the service and then reimburse 10% of the revenues to the wireless telephony network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A mobile switching center (MSC) comprising:
a satellite service provider gateway;
a satellite traffic controller;
a base station gateway;
the satellite service provider gateway being operable to retrieve satellite radio program content from a satellite service provider and send the information to the satellite traffic controller, the satellite traffic controller managing service requests for satellite radio program content from at least one mobile station and being operable to deliver requested content to the at least one mobile station at a selected quality of service level, the selected quality of service level having been selected from among multiple service levels available for delivery of satellite radio content, the multiple service levels including at least one service level greater than that of conventional voice bearer traffic, the base station gateway operably connecting the satellite traffic controller to one or more base stations serving the at least one mobile station and thereby being operable to communicate the requested satellite radio program content from the satellite traffic controller to the at least one mobile station at the selected quality of service level.

2. The MSC of claim 1, the satellite traffic controller operable to deliver the requested satellite radio program content responsive to determining the at least one mobile station is authorized to receive the requested content, a positive determination being made if the requested content is authorized pursuant to an existing subscription with the satellite service provide.

3. The MSC of claim 1, the satellite traffic controller operable to deliver the requested satellite radio program content responsive to determining the at least one mobile station is authorized to receive the requested content, a positive determination being made if the requested content is purchased by the at least one mobile station coincident to the service request.

4. The MSC of claim 1, wherein the satellite traffic controller is operable to query the at least one mobile station to select the selected quality of service level from among the multiple service levels available for delivering the content to the at least one mobile station.

5. In a communication system including a mobile switching center (MSC) comprising a satellite service provider gateway, a satellite traffic controller and a base station gateway, a method comprising:

the satellite service provider gateway retrieving satellite radio program content from a satellite service provider and sending the content to the satellite traffic controller;

the satellite traffic controller managing service requests for satellite radio program content from at least one mobile station and delivering requested content to the at least one mobile station at a selected quality of service level, the selected quality of service level having been selected from among multiple service levels available for delivery of satellite radio content, the multiple service levels including at least one service level greater than that of conventional voice bearer traffic; and the base station gateway operably connecting the satellite traffic controller to one or more base stations serving the at least one mobile station and thereby being operable to communicate the requested satellite radio program content from the satellite traffic controller to the at least one mobile station at the selected quality of service level.

6. The method of claim 5, further comprising the satellite traffic controller:

determining the at least one mobile station is authorized to receive the requested content, a positive determination being made if the requested content is authorized pursuant to an existing subscription with the satellite service provider; and delivering the requested satellite radio program content responsive to determining the at least one mobile station is authorized to receive the requested content.

7. The method of claim 5, further comprising the satellite traffic controller:

determining the at least one mobile station is authorized to receive the requested content, a positive determination being made if the requested content is purchased by the at least one mobile station coincident to the service request; and delivering the requested satellite radio program content responsive to determining the at least one mobile station is authorized to receive the requested content.

8. The method of claim 5, further comprising the satellite traffic controller querying the at least one mobile station to select the selected quality of service level from among the multiple service levels available for delivering the content to the at least one mobile station.

* * * * *